(No Model.)　　　　　　　J. F. McLAUGHLIN.　　　　2 Sheets—Sheet 1.
ELECTRIC RAILWAY.
No. 544,862.　　　　　　　　　　　Patented Aug. 20, 1895.
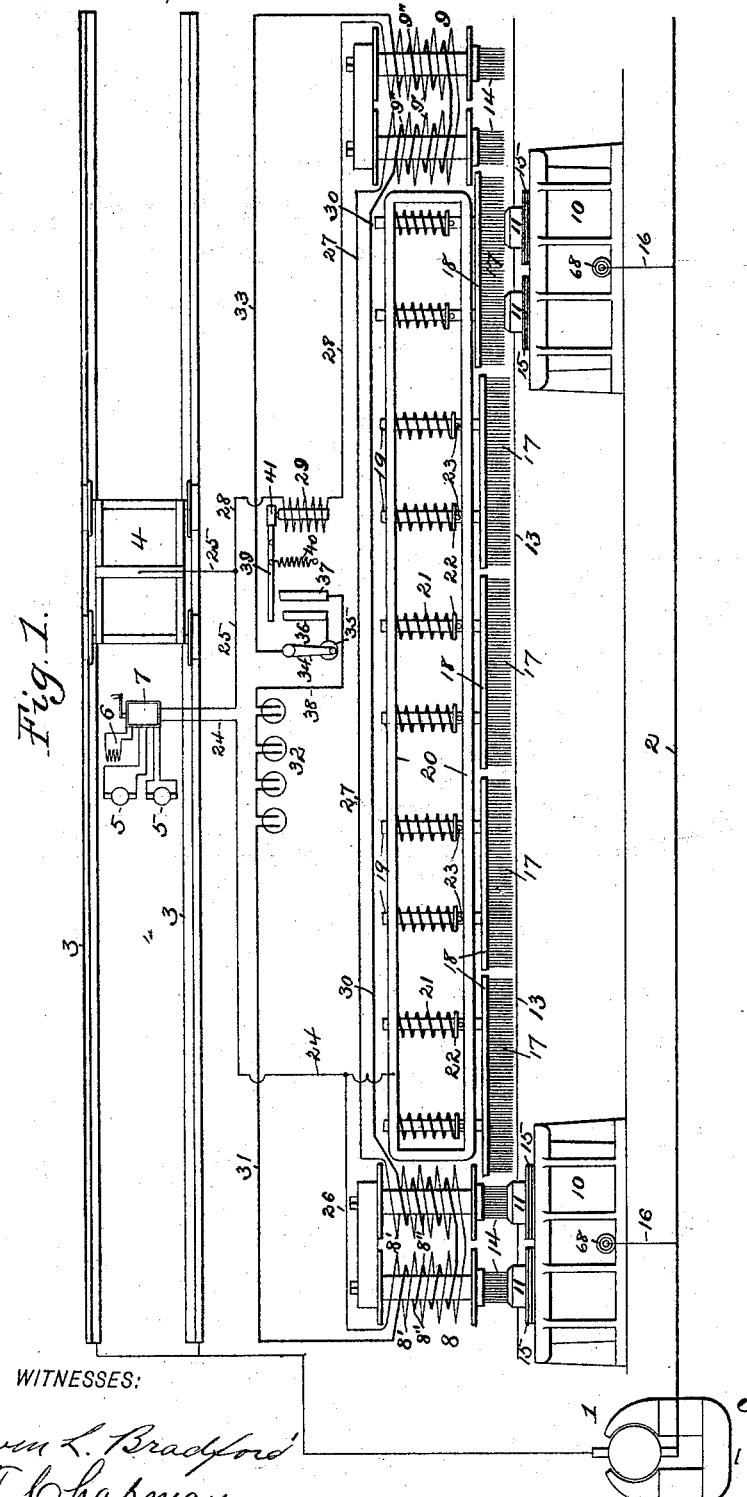
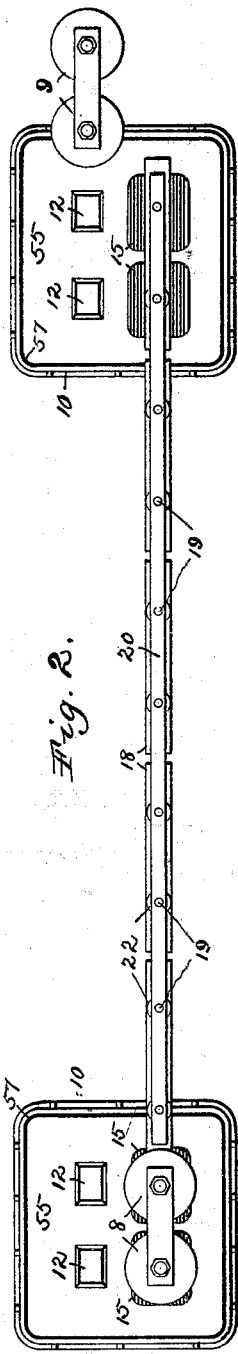
WITNESSES:
Edwin L. Bradford
F. T. Chapman.
INVENTOR,
James F. McLaughlin,
BY Joseph Lyons.
ATTORNEY.

(No Model.) 2 Sheets—Sheet 2.
J. F. McLAUGHLIN.
ELECTRIC RAILWAY.
No. 544,862. Patented Aug. 20, 1895.
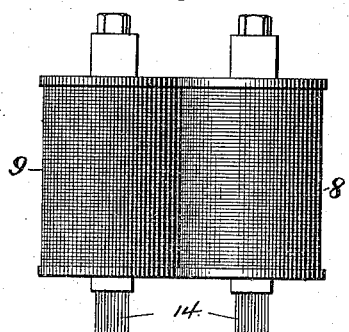
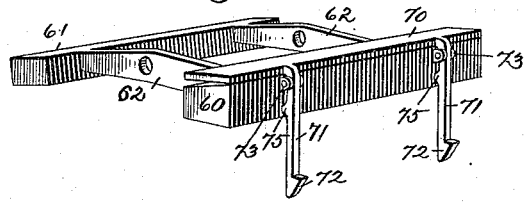
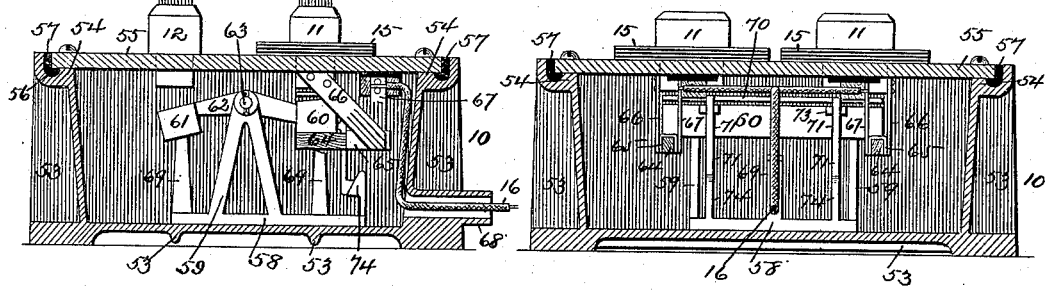
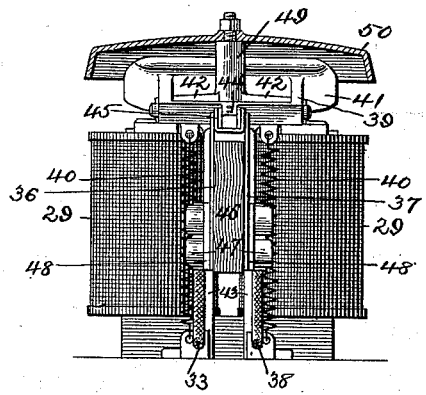
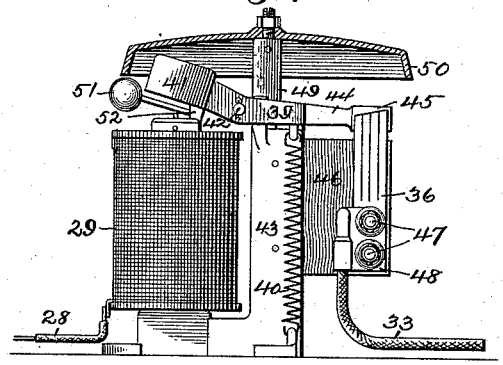
WITNESSES:
Edwin L. Bradford
F. T. Chapman
INVENTOR,
James F. McLaughlin,
BY Joseph Lyons.
ATTORNEY.

UNITED STATES PATENT OFFICE.

JAMES F. McLAUGHLIN, OF PHILADELPHIA, PENNSYLVANIA.

ELECTRIC RAILWAY.

SPECIFICATION forming part of Letters Patent No. 544,862, dated August 20, 1895.

Application filed April 17, 1895. Serial No. 546,094. (No model.)

*To all whom it may concern:*

Be it known that I, JAMES F. MCLAUGHLIN, a citizen of the United States, and a resident of Philadelphia, in the county of Philadelphia and State of Pennsylvania, have invented certain new and useful Improvements in Electric Railways, of which the following is a specification.

This invention has reference to improvements in electric railways in which exposed contacts on the surface of the road-bed are coupled to a buried supply-conductor by underground switches operated by magnetic attraction from the motor-car.

The objects of the present invention are to provide an improved means for collecting the current from the exposed contacts, and also to provide the magnets upon the cars for closing and opening the circuit between the supply-conductor and the exposed contacts with a secondary circuit, which is automatically closed when the main circuit through the magnet is broken either accidentally by burning out or otherwise, whereby the stopping of the cars from the failure of the magnets to operate the underground switches is avoided. These objects are realized in the structure illustrated in the accompanying drawings, forming a part of this specification, in which—

Figure 1 is a diagram showing the application of my improvement to an electric railway. Fig. 2 is a plan view of two switch-boxes, with two traveling switch-operating magnets and a current-collector shown in operative relation to the switch-boxes. Fig. 3 is a cross-section of a switch-box, showing the traveling switch-operating magnets in elevation and in operative relation to the switch-box. Fig. 4 is a longitudinal section of the switch-box. Fig. 5 is a perspective view of the switch lever and latch removed from the switch-box and with the circuit-closing jacks omitted; and Figs. 6 and 7 are end and side elevations, respectively, of the automatic controller for the local-circuit coils of the traveling switch-operating magnets.

Referring to the drawings, and more particularly to Figs. 1 and 2, there is shown a generator 1, connected on one side to a main or supply conductor 2 and on the other side to the traffic-rails 3 of a single-track railroad. It will be understood that in practice the conductor 2 is suitably insulated and buried beneath the road-bed adjacent to or between the traffic-rails, or, in the case of a double-track road, this conductor may be buried midway between the two tracks.

The motor-car is represented in Fig. 1 by a simple diagrammatic view of its truck 4. Upon this truck are two motors 5 5 (shown separated from the truck in the diagram) one of the motors being provided with the usual starting-coil 6. The car is also provided with the ordinary circuit-controller 7. Depending from the motor-car truck are two electro-magnets 8 9 of the horseshoe type, the magnet 8 being located at or near the front end of the car-truck and the magnet 9 at or near the rear end of the same. The two magnets are displaced laterally with reference to each other, so that they travel in different vertical planes. These two magnets are suitably secured to the car-truck in such manner as to have their pole-pieces moderately close to the surface of the road-bed, as is usual in electric railroads of the type to which this invention relates. Buried in the road-bed in the line of travel of each of these magnets is a series of switch-boxes 10, inclosing suitable switches capable of being operated by the magnets on the car, and which will hereinafter be described in detail with reference to Figs. 3, 4, and 5. Projecting upwardly from the top of each switch-box are four iron blocks 11 11 12 12, with their upper ends projecting slightly above the surface of the road-bed, which is indicated in Fig. 1 by the line 13. The two blocks 11 11 are in line with each other and in the line of travel of the magnet 8, and the two blocks 12 12 are in line with each other and in the line of travel of the magnet 9. The magnets 8 and 9 each have their pole-pieces provided with downwardly-projecting iron brushes 14, which, as the magnets pass over the blocks, make contact therewith, so that the said blocks constitute for the time being extended pole-pieces of the magnets. These blocks 11 12 project into the switch-box close to the switch-lever, as will appear further on, so that the attractive force of the magnets upon the switch-lever is utilized to the best advantage. The two blocks 11 are insulated from the switch-box by interposed insulation 15, indicated by suitable shading, and these blocks are placed in circuit with branch conductors 16, coming from the supply-conductor 2, by means of the magnetically-operated switch in the switch-box in any suitable manner, but preferably in the manner to be hereinafter described.

Directly behind the magnet 8 and in line herewith there is mounted on the car-truck an extended contact device for collecting the current from the blocks 11 and delivering it to the motor or motors on the car. This contact device consists of a number of brushes 17, close to the surface of the road-bed, and preferably formed of phosphor-bronze wires fixed to plates 18. Pairs of vertical guide-rods 19, passing through suitably-spaced holes in the two sides of a long narrow rectangular frame 20, fastened in any suitable manner to the car-truck frame, are secured at their lower ends to and support the brush-plates 18. Surrounding each rod 19 is a helical spring 21, confined between the under face of the upper side bar of the frame 20 and a washer 22 on the rod 19. This washer rests on a pin 23 fixed in the rod 19. The tendency of the springs 21 is to force the collecting-brushes 17 downward to the road-bed; but this movement is limited by the pins 23, engaging the upper face of the lower side bar of the frame 20. It will be apparent without further explanation that the brushes will readily yield to and ride over any obstruction on the road-bed that they may come in contact with. In their normal position the lower ends of the brushes are slightly below the upper surface of the contact-blocks 11, and the edges of the latter are slightly beveled. On reaching these blocks the wires of the brushes will yield somewhat, because of their elasticity, and the brushes will also rise bodily against the action of the springs 21. This will insure excellent contact between the brushes and the blocks 11. The current flowing from said blocks will be conveyed from the brushes through the rods 19 to the frame 20, either directly or by auxiliary flexible conductors. (Not shown.) This frame 20 is connected by a conductor 24 to the controller 7, by which latter the circuit is completed to the motor or motors, and from this controller a conductor 25 extends to the truck-frame 4, through the wheels of which the circuit is completed to the rails 3 and thence back to the generator 1. A branch conductor 26, coming from the conductor 24, extends to the magnet 8, the normal coils 8' of which are connected in series with the normal coils 9' of the magnet 9 by a conductor 27, the circuit being completed from the latter by a conductor 28, which is connected with the conductor 25 and includes an electromagnet 29, the purpose of which latter will presently appear. The normal or main coils of the magnets 8 and 9 are thus in shunt around the motors 5 and circuit-controller 7, and are therefore unaffected by the running of the car. There is a sufficient number of brushes 17 to extend from one switch-box to the next in order, so that the circuit to the motor from the main conductor 2 will always be completed through a switch-box before the last brush 17 has left the blocks 11 of the preceding switch-box.

During the normal operation of the car the magnets 8 and 9 are energized by the branch 26 27 28 of the main circuit upon the car. It sometimes happens that this circuit becomes broken either by the burning out of the main coils of the magnets or from some other cause, and the magnets, being thereby de-energized, fail to operate the underground switches. The car therefore quickly comes to a standstill because no current is supplied to the motors. To guard against such a contingency each magnet is wound, in addition to the high-resistance main coils, with local-circuit coils 8'' 9'' of low resistance. (Indicated by the heavy lines in Fig. 1.) These local-circuit coils of the two magnets are connected in series by a conductor 30, and the coils 8'' are connected by a conductor 31 to one terminal of a storage or other battery 32 on the car, and the coils 9'' are connected by a conductor 33 to a hand-switch 34, in the path of which is a contact-block 35, which latter is connected to one plate 36 of a jack-knife switch, while the other plate 37 of this switch is connected by a conductor 38 to the other terminal of the battery 32. A switch-lever 39 is arranged with one end adapted to bridge the two plates 36 37, toward which it is urged by a spring or springs 40. The other end of the switch-lever is provided with a head 41, constituting an armature for the magnets 29.

In the normal operation of the system the magnet 29 is energized by the line-current, and therefore the armature 41 is attracted to this magnet against the action of the spring 40, thereby breaking the circuit between the plates 36 and 37. When, however, the main circuit is broken, either accidentally or purposely, the armature 41 is no longer attracted by the magnet 29, and the spring 40 draws the switch-lever 39 into contact with the two plates 36 and 37, so as to bridge the same. If, under these conditions, the local circuit is closed by moving the switch 34 upon the plate 35, the current from the battery 32 will immediately energize the magnets 8 9 and the latter will operate the underground switches when moved over them.

The switch 34 is utilized for energizing the magnets 8 9 by means of the local circuit when the car is taken out of the car-house preparatory to starting on a trip. As soon, however, as an underground switch is closed by the magnets 8, energized by the battery 32, and the first of the brushes 17 comes in contact with one of the blocks 11, the main magnet-circuit is closed. The magnet 29, being thereby energized, automatically breaks the local circuit by attracting the armature 41, and the latter is held in this position so long as the main circuit to the magnets 8 and 9 remains closed. During the time the car stays upon the road the switch 34 is allowed to remain in the closed position, so that, should the main circuit through the magnets 8 9 be broken—as, for instance, by the latter burning out—the local circuit will be immediately established and the magnets 8 and 9 will continue to operate the underground switches as before, thereby insuring the proper operation of the motor-car even under the extraordinary conditions noted. The secondary battery 32 may consist of but few cells, since it is only necessary that the magnets be energized thereby (should the main magnet-circuit be broken) until the car again reaches the terminal station, where the damage can be repaired. However, since the switch 39, controlling the local circuit for the magnets 8 and 9, is operated automatically to close the said circuit when a break occurs in the main magnet-circuit, the car will operate as though no accident had happened, and unless the motorman be made aware of the fact that the main coil-circuit has been broken, he would put the car upon a second trip without repairing the injury sustained, and the secondary battery upon which he is now drawing might become exhausted while the car is still on the road. To avoid this I provide means for notifying the motorman of the accident that has occurred. These means are shown in Figs. 6 and 7, which also illustrate in detail the automatic controller for the local energizing-circuit already briefly described with reference to Fig. 1.

The magnet 29, as shown in these figures, is of the horseshoe type, and the switch-lever 39 consists of a yoke-piece pivoted to laterally-extending studs 42, projecting from the upper end of a post 43. The lever 39 terminates at one end in the head 41, constituting the armature for the magnet 29, and at the other end in an arm 44, carrying a U-shaped conducting strip or jack 45, adapted to enter between and bridge the two plates 36.

Fast to the post 43 and projecting laterally therefrom is a block 46 of insulating material, to opposite sides of which the plates 36 are secured in any suitable manner—as, for instance, by insulated bolts 47, which pass through the block and plates 36, and serve to secure to the latter the terminal plates 48, fast on the ends of the conductors leading to the plates 36.

In the structure illustrated in Figs. 6 and 7 two springs 40 are shown.

The post 43 has a stem 49 projecting above the studs 42, and to the top of this stem is secured a gong 50 in the path of a striker 51, projecting from a stud 52 on the under side of the armature 41, midway between the two coils of the magnet 29. The striker is so arranged that when the armature is released by the magnet 29 and is thrown upward by the springs 40 it will strike the gong 50, thus giving an audible signal that will notify the motorman of the fact that the main circuit through the magnets 8 and 9 has been ruptured and the local circuit has been closed. Thus he will be warned to turn his car in for repairs at the end of the trip.

The underground switch, which I use by preference, is illustrated in detail in Figs. 3, 4, and 5. It is adapted for general use in connection with a great variety of electric railways of this general character and constitutes a separate invention. It is here only described by way of example, but is claimed in a separate application, Serial No. 548,015.

The switch-box 10, which is also shown in Figs. 1 and 2, is a rectangular casting with the sides flaring slightly outward and strengthened by ribs 53, as shown. At the upper edge of the sides of the box there is formed a ledge 54, on which rests the cover 55 of the box, and to which the said cover is secured by screws, as indicated, or otherwise. Exterior to this ledge 54 there is formed a channel 56, with its outer wall continued upward until it is level with the upper face of the cover and a short distance from the edge of the same. This space, as well as the channel 56, is filled with waterproof insulating material 57, as indicated. The two pairs of blocks 11 12 are fixed in the cover 55 and project through the same into the exterior of the box, as before stated, the blocks 12 being insulated from the cover by suitable insulation 15.

Fast to the bottom of the box 10 is a base-plate 58, from each end of which rises a standard 59. To the upper ends of these two standards is pivoted the switch-lever, (shown in perspective in Fig. 5 and in elevation in Figs. 3 and 4,) and which also, as will presently be seen, constitutes an armature for each magnet 8 and 9. The switch-lever is a casting composed of two parallel iron bars 60 61, joined near each end by a cross-piece 62, the center of which latter is perforated for the passage of the pivot-bolt 63, mounted in the upper ends of the standards 59. When the switch-lever is placed in the box 10 and the cover 55 is applied, the two bars 60 61 are under the blocks 11 12, the bar 60 being beneath the two blocks 11 and the bar 61 being beneath the blocks 12. The bars 60 and 61 are each long enough to span the space between the pairs of blocks 11 and 12, respectively. Secured one to each end of the bar 61 there are blocks 64 of insulating material extending laterally from the said bar and carrying at their outer ends U-shaped metallic strips or jacks 65, adapted to enter between and bridge two pairs of brushes 66 67. The brushes 66 are each secured to the end of one of the blocks 11, which is within the box 10, and the other brushes 67 are each secured to insulating-blocks fast on the under side of the cover 55 of the box. The conductor 16 enters the box 10 through a neck 68 near the bottom thereof, and is then carried upward and branched, the terminals of the branches being connected to the respective brushes 67. The switch or armature lever is nicely balanced, so as to require but little power to move it, and its range of movement is limited by stops 69, erected on the base-plate 58. When the magnet 8 is over the blocks 11, the bar 60 is attracted, carrying the jacks 65 upward until they bridge the brushes 66 and 67, thus completing the circuit from the main conductor 2, through the branch conductor 16, to the two blocks 11, from which the current is collected by the brushes 17, immediately following the magnet 8. When the magnet 9 reaches the blocks 12, the bar 61 is attracted, thus depressing the bar 60 and breaking the circuit between the brushes 66 and 67. The friction between the jacks 65 and the brushes 66 and 67 is sufficient to maintain the armature-lever in the closed position after the magnet 8 has passed, even when the said armature-lever is subjected to considerable shocks. In order to prevent any danger from the accidental closing of the circuit after it has been opened by the magnet 9, I provide a positive lock, which will hold the armature-lever in the open position, except when operated by the magnet 8.

The lock consists, essentially, of an iron plate 70, having near its ends two arms 71, projecting therefrom at right angles thereto and each terminating in a beveled and shouldered head 72. This plate covers the top face of the bar 60, which is slightly beveled, as shown, and is hinged to the said bar by pins passed through the arms 71 and ears 73, formed on the bar. In the path of the heads 72 are other similar heads 74, fast on the base-plate 58. The plate 70, together with the arms 71, constitutes a gravity-latch, the movement of which around its hinge is limited in one direction by the beveled face of the bar 60, and in the other direction by lugs 75 on the arms 71, which lugs engage the side of the said bar 60. When the bar 60 is moved downward by the attractive force of the magnet 9, exerted on the bar 61, the heads 72 catch under the heads 74 and thereby lock the switch-lever in this position, which is the open position of the switch. When the magnet 8 is brought over the bar 60, the plate 70 is first attracted, and, turning around its hinge, unlocks the switch-lever, after which the bar 60 is drawn upward and the circuit closed by the switch.

It will be seen that with this device the switch is positively locked in the open position, and can therefore never be brought, accidentally, into the closed position, thus avoiding all danger from exposed active conductors on the road bed.

Having fully described my invention, what I claim and desire to secure by Letters Patent, is—

1. In an electric railway the combination with a main or supply conductor, exposed contact blocks arranged at intervals along the road bed, magnetically operated switches for coupling the main conductor to the contact blocks, traveling electro magnets for operating the switches, and a collector mounted independent of said magnets, bridging the contact blocks the circuit connections of which are controlled by two successive switches, and consisting of a rigid metallic frame carrying a series of independently spring actuated yielding contact brushes, substantially as described.

2. In an electric railway, the combination with a supply conductor, exposed contacts on the road bed, and magnetically operated switches for coupling the exposed contacts to the supply conductor, of traveling electro magnets each having two windings, one included in a branch of the line circuit and the other in a local circuit, and a switch controlled by the line circuit branch for closing the local circuit when the line circuit through the magnets is broken, substantially as described.

3. In an electric railway, having underground switches adapted to be operated by magnetic attraction from a motor car, switch operating magnets, on the motor-car, having two windings, one included in a branch of the main or line circuit and the other in a local circuit on the car, a switch for closing the local circuit controlled by the line circuit branch, and a signal controlled by the switch on closing the local circuit, substantially as described.

4. In an electric railway having underground switches adapted to be operated by magnetic attraction from a motor-car, switch operating magnets, on the motor car, having two windings, one included in a branch of the line circuit and the other in a local circuit upon the car, a switch for closing the local circuit controlled by the line circuit branch and a bell controlled by the switch, substantially as described.

5. In an electric railway, traveling electro-magnets, for operating circuit closing and opening devices in the road bed the coils of the magnets being charged by a branch of the line current, a normally open local circuit including other coils on the magnets, with a local source of current for the same and a switch for closing the local circuit controlled by the line circuit branch, substantially as described.

6. In an electric railway, the combination of a series of contact blocks spaced along the road, with a collector comprising a continuous and rigid metallic frame carried on the car and a series of independently spring controlled yielding brushes mounted in said frame, in electrical connection therewith, substantially as described.

7. A current collector for an electric railway, consisting of an elongated rigid metallic frame mounted on the car, a series of independently spring actuated guide rods mounted in the frame, and metallic wire brushes secured to the guide rods, substantially as described.

In testimony whereof I have signed my name to this specification in the presence of two subscribing witnesses.

JAMES F. McLAUGHLIN.

Witnesses:
 HENRY C. WEBSTER,
 HENRY JAMES.